No. 780,232. PATENTED JAN. 17, 1905.
M. P. SCHELL.
SAW FILING MACHINE.
APPLICATION FILED NOV. 9, 1903.

Witnesses:
F. C. Fliedner
H. Mouse

Inventor,
Maximilian P. Schell
By Geo. H. Strong atty

No. 780,232.  
Patented January 17, 1905.

UNITED STATES PATENT OFFICE.

MAXIMILIAN PAUL SCHELL, OF SAN FRANCISCO, CALIFORNIA, ASSIGNOR TO FOLKERS SAW FILING MACHINE CO., OF SAN FRANCISCO, CALIFORNIA, A CORPORATION.

SAW-FILING MACHINE.

SPECIFICATION forming part of Letters Patent No. 780,232, dated January 17, 1905.

Application filed November 9, 1903. Serial No. 180,371.

*To all whom it may concern:*

Be it known that I, MAXIMILIAN PAUL SCHELL, a citizen of Germany, residing at the city and in the county of San Francisco and State of California, have invented new and useful Improvements in Saw-Filing Machines, of which the following is a specification.

My invention relates to improvements in saw-filing machines, and particularly to that type of machines employing power-driven helical file members.

The object of the present invention is to provide a positive means for advancing the file-carriage and rotating the file members at uniform speed and to provide a novel means of mounting the files whereby they will act upon the teeth in a manner to produce the best result in conformity with usual saw-setting methods.

It consists of the parts and the construction and combination of parts, as hereinafter more fully described, having reference to the accompanying drawings, in which—

Figure 1:
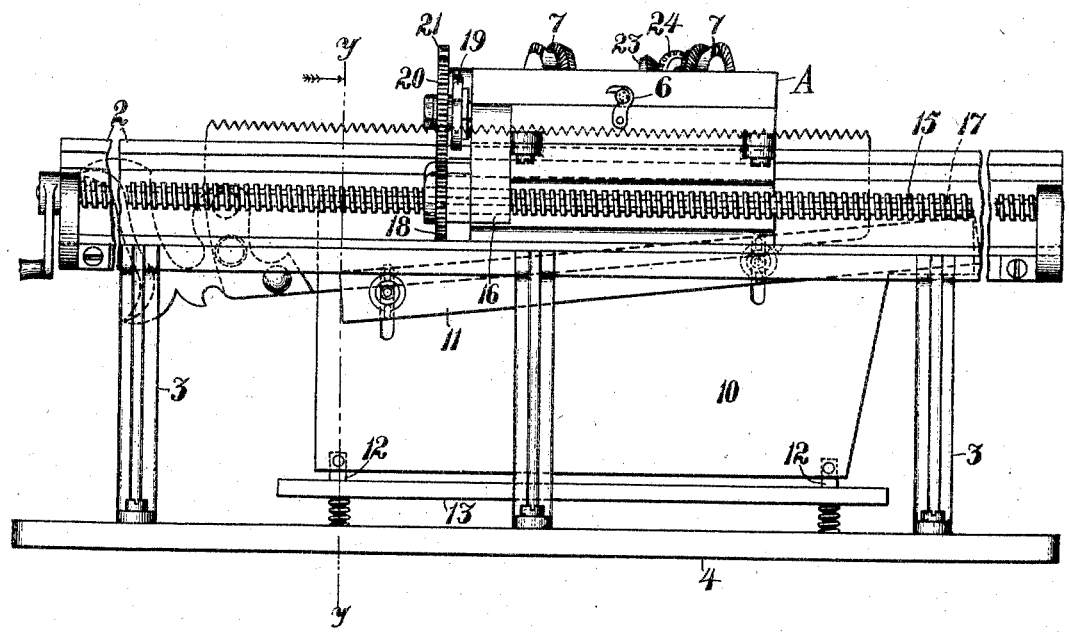
Figure 2:
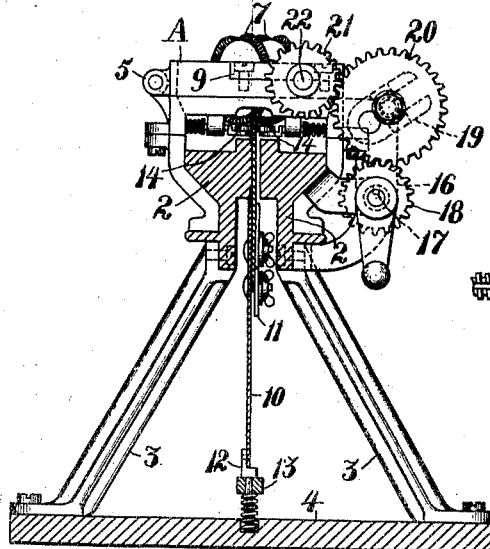
Figure 3:
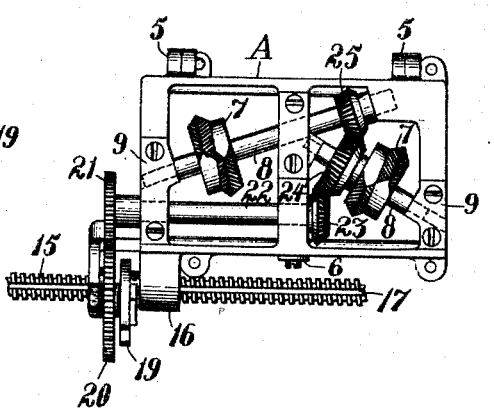

Figure 1 is a side elevation of my machine. Fig. 2 is a section taken on line $y\,y$, Fig. 1. Fig. 3 is a plan of the file-carriage.

A represents a file-carriage adapted to engage and slide upon the two parallel tracks 2, which are supported, by means of the standards 3, upon any suitable base, as 4. This carriage, the salient features of which are shown, described, and claimed in a companion application, Serial No. 180,370, filed by me of even date herewith, is preferably made in two parts hinged together at one side, as at 5, and adapted to be locked together by any suitable means, as shown at 6. The lower part of the carriage slides on the tracks 2, while the upper part carries the helical file members 7. The latter are arranged one behind the other, each on a separate shaft 8; but instead of their shafts lying parallel with each other they are disposed diagonally to the line of carriage movement, so as to bring the two planes of the files at an incline rather than at right angles, as is usual in filing-machines, to the plane of the saw. The disposition of the shafts and files is such that the files will straddle the saw and act upon opposite sides of it and upon alternate teeth as the carriage reciprocates along its tracks.

Heretofore in saw-filing machines it has been common to dispose the file members with their axes parallel to the saw, in which case the files cut directly across the saw. While they operated thus to bevel the teeth in conformity with the bevel of the abrading-surfaces of the files, they had the effect to bring the points of the teeth upon the wrong side. When the saw is set, alternate teeth are inclined uniformly to one side or the other of a central line. By the old method of machine-sharpening the teeth would have their highest point on the inside, whereas they should have and do have in hand-filing their highest points on the outside—that is, when teeth are properly sharpened the points on the teeth on one side of the saw are separated from those on the other side by a space equal to the width of the intended saw-cut, which is always a little greater than the thickness of the blade. Under the old method, however, the points on the teeth were brought more nearly into line, and consequently the saw did not cut its full width, or at least not with the same degree of satisfaction as with a properly hand-sharpened saw. By disposing the file members in intersecting planes and diagonal to the saw-plane they act on the saw-teeth more nearly after the fashion of a three-cornered hand-file, which is always operated at an incline to the length of the saw.

The shafts of the file members are journaled in removable boxes 9, which readily permit of one set of members being replaced by another to suit saws of different pitch. By hinging the file-carrier it allows the files and saw-teeth to be inspected at any period of the operation.

The saw to be sharpened is clamped in a suitable removable and adjustable saw frame or hanger, which comprises a vertically-slotted plate 10, having a complementary clamping member 11, between which two parts the saw is locked and then inserted into the machine, the plate having a series of rigid projections 12, seating in sockets in the spring-supported bar 13, disposed in the plane of the opening between the tracks. The upper portion of the saw adjacent to the file members is supported between the adjustable horizontal guide-rollers 14.

The positive reciprocation of the carriage and the rotation of the file members without strain on the saw-teeth is effected through the medium of suitable gearing, hereinafter mentioned, and a horizontal screw 15, journaled in the machine-frame and disposed parallel with tracks 2. This shaft engages a nut 16, rigid with the lower part of carriage A to propel the latter. The shaft has a keyway 17, in which is adapted to engage a corresponding feather in a sliding gear-wheel 18, supported in brackets on the lower part of the carriage.

19 is an adjustable slotted arm suitably attached to the carriage and arranged to carry an idle gear 20, which may be moved in or out or to either side to adjust it to mesh with gear 18 and with a second gear 21 on shaft 22 on the carriage. Shaft 22 carries a bevel-gear 23, which meshes a corresponding gear 24 on the forward file-member shaft. Gear 24 engages a similar gear 25 on the second file-member shaft, and thus by turning screw 15 the carriage is moved longitudinally and the file members are rotated simultaneously and in opposite directions. While the propelling medium for the carriage is thus entirely external to and independent of the saw-teeth, yet it is essential that a definite relationship should be observed between the speed of the carriage and the speed of the grinders, which latter in turn vary according to the pitch of different saw-teeth. Accordingly with saws of different pitch it will be necessary to change gears 18 and 21 correspondingly with the change of the grinders or file members. The pivoted radial slotted support 19 allows the intermediate transmission-gear 20 to be adjusted to intermesh with whatever sized gears 18 21 may be used.

Having thus described my invention, what I claim, and desire to secure by Letters Patent, is—

1. In a saw-filing machine the combination with a suitable support and a carriage slidable thereon, of a pair of oppositely-inclined shafts both arranged diagonal to the plane of the saw and one of said shafts intersecting the axis of the other at a point intermediate of the ends of the latter, a file member on each of said shafts and intermeshing gears between the adjacent overlapping ends of the shafts and one directly engaging the other.

2. In a saw-filing machine, the combination with parallel tracks, of a file-carriage having a part engaging and reciprocable on said tracks and a part hinged to said reciprocating part and helical file members removably journaled in said hinged part.

3. In a saw-filing machine, the combination with parallel tracks, of a file-carriage mounted on said tracks, helical file members, means including a longitudinal screw-shaft and a nut on the carriage for reciprocating the latter, a shaft parallel with the screw-shaft, gearing between said shafts, and gearing between the second-named shaft and the file members for operating the latter.

4. In a saw-filing machine, a reciprocable carriage, helical file members mounted thereon, interengaging gears between the file members, means for rotating the file members including a shaft and a gear carried thereby and engaging one of the first-named gears, and means for reciprocating the carriage including a screw-shaft, a nut on the carriage engaged thereby, and intermeshing gears one on the screw-shaft and the other on the first-named shaft whereby the carriage is reciprocated simultaneously with the rotation of the file members.

In testimony whereof I have hereunto set my hand in presence of two subscribing witnesses.

MAXIMILIAN PAUL SCHELL.

Witnesses:
S. H. NOURSE,
JESSIE C. BRODIE.